Nov. 17, 1942.    J. F. MORRELL    2,302,244
PIPE COUPLING AND SEALING DEVICE
Filed Jan. 27, 1942

INVENTOR,
John F. Morrell
Henry Molz
ATTORNEY.

Patented Nov. 17, 1942

2,302,244

UNITED STATES PATENT OFFICE 2,302,244

PIPE COUPLING AND SEALING DEVICE

John F. Morrell, Glendale, Calif.

Application January 27, 1942, Serial No. 428,379

2 Claims. (Cl. 285—114)

The primary object of the invention is to provide a pipe coupling combining a means for effectively sealing the pipe run at each jointure of pipe length and fitting, together with the elimination of various and sundry pipe fittings commonly employed.

An object of the invention is to provide a pipe coupling combining a means for adequately centering each pipe length or pipe fitting at its jointure in the pipe line, permanently retaining the same in said centered position, and permitting the sealing of the joint while so retained.

A further object of the herein invention is the provision of a pipe coupling whereby an end of two separate pipe lengths, or pipe fittings, or a combination thereof, may simultaneously be engageably secured and effectively sealed-leak proof, and against plant growth, roots, etc., from entering the pipe line.

A further object of the herein invention is the provision of a pipe coupling in combination with a sealing means, whereby the sealing operation requires no oakum or other more commonly used stuffing means.

A still further and highly important object of the herein invention is the provision of a pipe coupling replacing the use of various pipe fittings, L's, angles, crosses and T's, for example, more or less commonly employed in water, irrigation, sewer, and other pipe lines regardless of purpose.

And a still further object of the herein invention is the provision of a pipe coupling and sealing device, in combination, whereby the pipe run, however rough, chipped or jagged the respective ends of the pipe lengths or fittings may be, is positively and effectively sealable-leak proof, in a continuous and unobstructive manner.

Other objects and advantages of the invention will more fully appear as this specification proceeds and as is set forth in the appended claims.

I attain these objects by the device described in the accompanying drawing, in which.

Figure 1:
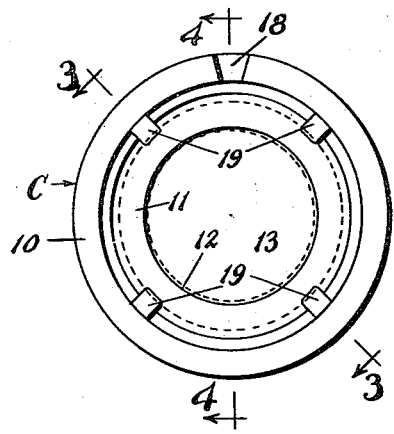
Figure 1 is an end view of one form of the coupling with the inside diameter and the outside diameter of a connecting pipe, both shown in broken lines.
Figure 2:
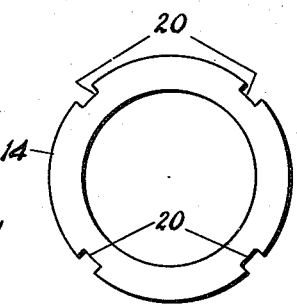
Figure 2 is an end view of a gasket associated with the coupling when connected to a pipe end.
Figure 3:
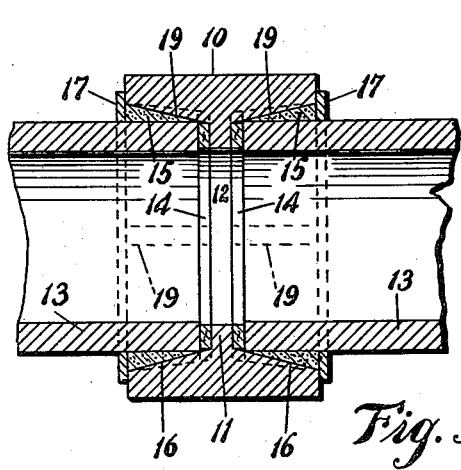
Figure 3 is a section on line 3—3 of Fig. 1, but with certain pipe ends and other parts in full lines.
Figure 4:
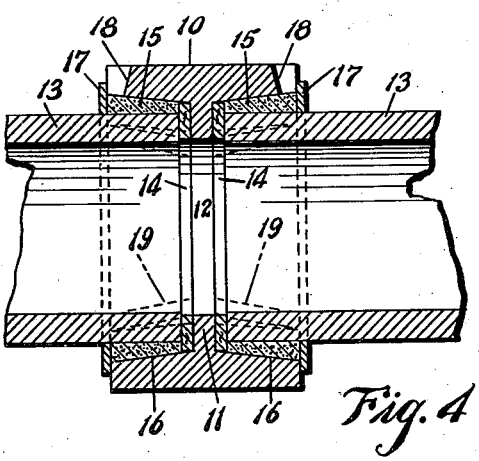
Figure 4 is a section similar to Fig. 3, but taken on line 4—4 of Fig. 1.

Similar leters and numerals of reference indicate like parts throughout the several views. Thus, as indicated in Fig. 1, Fig. 3 and Fig. 4, the coupling C is an annular or tubular body member 10 having a centrally located core like web or flange 11 provided with a bore 12 of slightly less diameter than the inside diameter of the connecting pipe 13.

Gaskets 14 of paper or other fibrous material are provided to temporarily seal the connection between the web 11 and the pipe 13. The gaskets are necessary and advisable because the ends of the pipe or fittings are often irregular due to cutting or breaking to a desired length, handling, shipping, and even as manufactured. Being soft and pliable, the gaskets readily seat the ends in a tightly closed relation with the coupling, both pipe or fitting ends being forced in said close relationship with the coupling; and, thus secured, the sealing fluid is restrained from entering the pipe proper, and a positive seal is secured.

The sealing substance 15 may consist of molten lead, cement or other suitable substance. Any substance readily and quickly solidifiable after being poured into the coupling and settling into the space provided by the difference between the outside diameter of the pipe 13 and the inside diameter 16 of the annular member 10 adjacent each side of the web 11, will answer.

Should the gasket 14 erode at a later time the sealing substance 15 will prevent any leakage at the joint.

Washers 17 with an inside diameter snugly fitting the outside of the pipes 13 are provided against the ends of the couplings to hold in the sealing substance until it solidifies.

Orifices 18 are provided permitting the pouring of the sealing substance 15 from the periphery of the annular member 10 into the interior of said member.

A plurality of inclined ribs or lugs 19, integral with the member 10 are equally disposed about and parallel to the axis of the diameter 16 to provide guides for centering and wedging the pipes 13 until the substance 15 has set and hardened so as to permanently unite the coupling C and the pipes 13.

While I have shown four of said ribs or lugs, three or more than four equally spaced within the coupling may as readily be employed. They serve a triple purpose in that they provide a rest or seat for the pipe ends, wedge and guide the same into a secured centered position in relation to the coupling, and create a spaced portion between the coupling proper and the pipe ends wherein the liquid sealing substance may flow to set.

Notches 20 may be provided in the gasket 14 corresponding to the spacing of the lugs 19.

Figure 5:
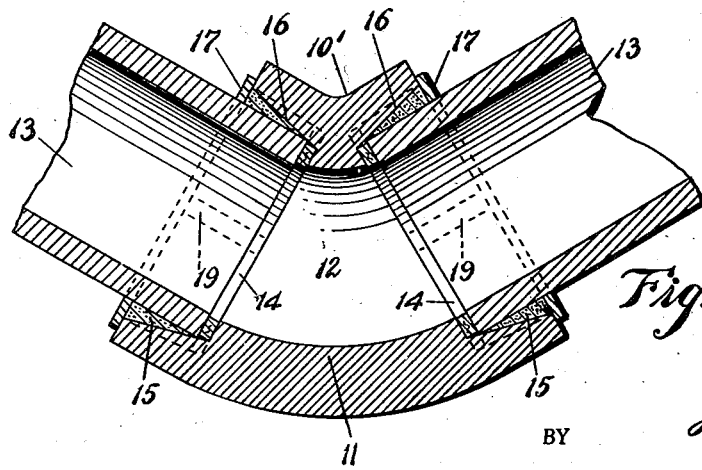
Figure 5 is a section similar to Fig. 3, but taken through another form of the invention (not otherwise shown) depicting the coupling adopted for use as an elbow fitting.

The respective parts pertaining to the elbow type coupling 10' shown in Fig. 5, are identically numbered and of identical function with those of the annular coupling member 10. And for other types of fittings, the coupling in its manufacture would also be identical in substance, a mere change of style in its formation creating the only difference from that of the elbow type shown.

The coupling may be produced from cement, clay, metal or of other suitable substance common to the manufacture of pipe and pipe fittings in general. In size and shape, it may readily be manufactured in keeping with pipe line requirements in common use. With it, the bell type of pipe may be entirely dispensed with. Straight line pipe alone is required. A marked saving in cost, bulk and shipping expense is thus assured, the cost of the coupling being considerably less than the material savings thereby effected. Moreover, since the coupling actually becomes an integral part of the pipe line, less piping is required to complete the job than with the use of the ordinary bell and spigot type of connection. When bell type of piping is employed, the bell portion must be removed.

I am aware that changes in construction of the invention may from time to time readily suggest themselves, but within the scope of the invention as herein disclosed. Hence, I do not limit my invention to the exact description of structure set forth, but what I do claim is:

1. In a pipe coupling, a tubular body member having a tapered bore and adapted to telescope the ends of pipes coupled therewith, an internal flange disposed in said body member to lie between the ends of said pipes, said tapered bore increasing in diameter from both sides of said internal flange to the outer end of said bore, and having openings leading from the interior to the outer periphery thereof, and wherethrough sealing material is introduced between said pipes and said body member, a plurality of ribs extending radially into said bore and longitudinally from the ends of the body member on opposite sides of said flange, said ribs being tapered so that their inner end portions will contact said pipes, said contact centralizing and securing said pipes in elevated relation to said bore, and whereby a spaced portion is provided between said pipes, and said bore.

2. In a pipe coupling, a tubular body member having a tapered bore and adapted to telescope the ends of pipes to be coupled, and an internal flange disposed in said member to lie between the ends of said pipes, the bore of said body member extending on opposite sides of said internal flange and having openings leading from the interior to the outer periphery thereof, and wherethrough sealing material is introduced between said pipes and said body member, said bore having tapered ribs extending radially and integrally of said bore, and longitudinally from the ends thereof to said flange, and on opposite sides thereof.

JOHN F. MORRELL.